United States Patent
Erickson

(10) Patent No.: US 7,163,968 B2
(45) Date of Patent: Jan. 16, 2007

(54) UV CURABLE PRESSURE SENSITIVE ADHESIVES

(75) Inventor: James R. Erickson, Katy, TX (US)

(73) Assignee: Kraton Polymers U.S. LLC, Houston, TX (US)

( * ) Notice: Subject to any disclaimer, the term of this patent is extended or adjusted under 35 U.S.C. 154(b) by 137 days.

(21) Appl. No.: 10/803,071

(22) Filed: Mar. 16, 2004

(65) Prior Publication Data

US 2005/0209356 A1    Sep. 22, 2005

(51) Int. Cl.
*C08F 2/46* (2006.01)
*C08F 297/04* (2006.01)

(52) U.S. Cl. ............... 522/158; 522/109; 522/110; 522/111; 522/112; 522/159; 522/160; 522/151; 525/93; 524/270; 524/271

(58) Field of Classification Search .......... 522/158, 522/159, 160, 161, 112, 111, 110, 109; 524/270, 524/271; 525/93
See application file for complete search history.

(56) References Cited

U.S. PATENT DOCUMENTS

| | | | | |
|---|---|---|---|---|
| 4,561,669 A | * | 12/1985 | Simons | ............ 280/276 |
| 5,088,705 A | * | 2/1992 | Tsai | ............ 267/226 |
| 5,389,701 A | * | 2/1995 | Erickson | ............ 522/158 |
| 5,393,843 A | | 2/1995 | Handlin, Jr. et al. | |
| 5,721,318 A | | 2/1998 | St. Clair et al. | |
| 5,810,380 A | * | 9/1998 | Lin | ............ 280/279 |
| 6,036,212 A | * | 3/2000 | Baldomero | ............ 280/276 |
| 6,155,541 A | * | 12/2000 | Farris et al. | ............ 267/64.15 |
| 6,260,870 B1 | * | 7/2001 | Fan | ............ 280/276 |
| 6,525,142 B1 | | 2/2003 | Erickson et al. | |
| 6,541,553 B1 | | 4/2003 | Erickson et al. | |
| 6,604,886 B1 | * | 8/2003 | Kinzler et al. | ............ 403/370 |
| 2003/0065048 A1 | | 4/2003 | Paul | |

FOREIGN PATENT DOCUMENTS

EP    0 785 974 B1    2/1999

OTHER PUBLICATIONS

Erickson et al., "Liquid Reactive Polymers for Radiation Curable High Performance PSAs", *Adhesives Age*, Nov. (1995).
Erickson et al., "High Performance UV Curable PSAs Offer High Production Speeds", *Adhesives Age*, Sep. (1998).
Erickson et al. "Kraton Liquid Polymer /Solid Polymer Hybrid UV Cure Adhesives with Stable Peel Strength", Presented at the *Pressure Sensitive Tape Council's TECH XXV Seminar*, May (2002).

* cited by examiner

*Primary Examiner*—Sanza L. McClendon
(74) *Attorney, Agent, or Firm*—Michael A. Masse; Novak Druce & Quigg

(57) ABSTRACT

UV curable adhesives are provided that comprise epoxidized monohydroxylated polydiene polymers, hydrogenated hydroxylated polydiene polymers, and selectively hydrogenated starblock copolymers. The adhesive formulations provide both excellent room temperature properties of tack and peel and excellent holding power at temperatures as high as 95° C.

20 Claims, No Drawings

UV CURABLE PRESSURE SENSITIVE ADHESIVES

FIELD OF THE INVENTION

This invention relates to improved high performance UV curable pressure sensitive adhesives having excellent high temperature holding power.

BACKGROUND

Pressure sensitive adhesives based on low molecular weight epoxidized polydienes are known in the art. These polymers are typically crosslinked using chemical crosslinking agents or by UV or electron beam induced reaction of the epoxy groups to form a high molecular weight network. As taught in European Patent 0 785 974 B1, however, when the polymer is sufficiently epoxidized to yield suitably short reaction times the resulting network is highly crosslinked. As such, adhesives composed of low molecular weight epoxidized polydienes and typical formulating agents such as tackifiers and plasticizing oils, yield strong adhesives which have little pressure sensitive character.

One solution to this problem taught in EP 0 785 974 B1 was the addition of monohydroxylated low molecular weight polydienes. The monohydroxylated polydiene reacted with and thereby consumed some fraction of the epoxy groups without affecting crosslinking. In this approach, adhesive formulations were found such that the crosslinked network was loosened and a proper balance of pressure sensitive adhesive properties.

Another solution to this problem taught in EP 0 785 974 B1 was the replacement of the monohydroxylated polydiene in part or in total by a dihydroxylated polydiene. While formulations were found which gave high gel contents, high temperature holding power was poor.

A need yet exists for UV curable pressure sensitive adhesives which have suitable tack and peel properties but the further improvement of high temperature performance. The adhesive formulations of the present invention address this need. UV curable pressure sensitive adhesive formulations have been found which comprise monohydroxylated epoxidized polydiene polymers, a high molecular weight starblock copolymer, a hydroxylated polydiene having more than one hydroxyl group per molecule, a tackifier and a photoinitiator. Surprisingly, the inclusion of the hydroxylated polydiene having more than one hydroxyl group per molecule did not result in an overly crosslinked adhesive, but rather led to an improved and heretofore unachieved balance of properties.

SUMMARY OF THE INVENTION

1. A UV curable pressure sensitive adhesive comprising:
   a) from 15 percent to 35 percent by weight of an epoxidized monohydroxylated polydiene polymer which is comprised of at least two polymerizable ethenically unsaturated hydrocarbon monomers wherein one is a diene monomer which yields unsaturation suitable for epoxidation and wherein the polymer has been epoxidized to have from 0.1 to 7.0 meq of epoxy functional group per gram of polymer;
   b) from 10 percent to 30 percent by weight of a hydrogenated, hydroxylated polydiene polymer which has on average from more than 1 to about 2 hydroxyl groups per molecule;
   c) from 1 percent to 15 percent by weight of a selectively hydrogenated starblock copolymer wherein the arms of the star comprise at least one block of hydrogenated polydiene and at least one block of poly(monovinyl arene);
   d) from 30 percent to 70 percent by weight of a tackifier; and
   e) from 0.01 percent to 3 percent by weight of a photoinitiator.

The adhesives of the present invention offer an excellent combination of peel strength, and improved high temperature holding power. As such, the PSA adhesive formulations of the present invention will be useful in tape and label adhesive applications where both room temperature and elevated temperature strength are required.

DETAILED DESCRIPTION OF THE INVENTION

Polymers containing ethylenic unsaturation can be prepared by anionically copolymerizing one or more olefins, particularly diolefins, by themselves or with one or more alkenyl aromatic hydrocarbon monomers. The copolymers may, of course, be random, tapered, block or a combination of these.

Diene containing polymers, having residual unsaturation suitable for epoxidation, may also be obtained by other means of polymerization, such as by cationic polymerization or free radical polymerization. Using cationic polymerization, monomers such as substituted 1-butenes, 1-pentenes and dienes such as isoprene and butadiene can be copolymerized. Like anionic polymerization, living cationic polymerization allows the copolymers to be block copolymers such that the residual diene double bond can be localized within the polymer. Dienes may be polymerized together with acrylic monomers by initiation with a free radical initiator, such a peroxide or AIBN. For pressure sensitive adhesive applications, monomers such as n-butyl acrylate, 2-ethyl-hexyl acrylate and isoprene may be used, and other modifying monomers, such as acrylic acid or 2-hydroxyethyl acrylate may also be used. Other polymerization methods including coordination/insertion mechanisms such as Ziegler-Natta polymerizations, metallocene polymerizations, and metathesis polymerizations can also be used to make polymers such as these.

The polymers containing ethylenic unsaturation or both aromatic and ethylenic unsaturation may be prepared using anionic initiators or polymerization catalysts. Such polymers may be prepared using bulk, solution or emulsion techniques. When polymerized to high molecular weight, the polymer containing at least ethylenic unsaturation will, generally, be recovered as a solid such as a crumb, a powder, a pellet or the like. When polymerized to low molecular weight, it may be recovered as a liquid.

In general, when solution anionic techniques are used, copolymers of conjugated diolefins, optionally with vinyl aromatic hydrocarbons, are prepared by contacting the monomer or monomers to be polymerized simultaneously or sequentially with an anionic polymerization initiator such as group IA metals, their alkyls, amides, silanolates, napthalides, biphenyls or anthracenyl derivatives. It is preferred to use an organo alkali metal (such as sodium or potassium) compound in a suitable solvent at a temperature within the range from about −150° C. to about 300° C., preferably at a temperature within the range from about 0° C. to about 100°

C. Particularly effective anionic polymerization initiators are organo lithium compounds having the general formula:

$$RLi_n$$

wherein R is an aliphatic, cycloaliphatic, aromatic or alkyl-substituted aromatic hydrocarbon radical having from 1 to about 20 carbon atoms and n is an integer of 1 to 4.

Conjugated diolefins which may be polymerized anionically include those conjugated diolefins containing from about 4 to about 24 carbon atoms such as 1,3-butadiene, isoprene, piperylene, methylpentadiene, phenyl-butadiene, 3,4-dimethyl-1,3-hexadiene, 4,5-diethyl-1,3-octadiene and the like. Isoprene and butadiene are the preferred conjugated diene monomers for use in the present invention because of their low cost and ready availability. Monovinyl arenes which may be copolymerized include vinyl aryl compounds such as styrene, various alkyl-substituted styrenes, alkoxy-substituted styrenes, vinyl napthalene, alkyl-substituted vinyl napthalenes and the like.

The monohydroxylated polydienes are synthesized by anionic polymerization of conjugated diene hydrocarbons with lithium initiators. This process is well known as described in U.S. Pat. Nos. 4,039,593 and Re. 27,145 which descriptions are incorporated herein by reference. Polymerization commences with a monolithium initiator which builds a living polymer backbone at each lithium site. Typical monolithium living polymer structures containing conjugated diene hydrocarbons are:

X-A-B—Li    (I)

X-A-B-A-Li    (II)

wherein B represents polymerized units of one conjugated diene hydrocarbon such as butadiene, A represents polymerized units of another conjugated diene such as isoprene, and either A or B may contain one or more vinyl aromatic compounds such as styrene, and X is the residue of a monolithium initiator such as sec-butyllithium. The hydroxyl groups are added by terminal capping the polymerization with oxiranes such as ethylene oxide followed by termination with methanol.

Monohydroxylated polydienes can also be made using a mono-lithium initiator which contains a hydroxyl group which has been blocked as the silyl ether. Details of the polymerization procedure can be found in U.S. Pat. No. 5,376,745 which is herein incorporated by reference. A suitable initiator is hydroxyporoyllithium in which the hydroxyl group is blocked as the tert-butyl-dimethylsilyl ether. This mono-lithium initiator can be used to polymerize isoprene or butadiene in hydrocarbon or polar solvent. The living polymer is then terminated with methanol. The silyl ether is then removed by acid catalyzed cleavage in the presence of water yielding the desired monohydroxy polydiene polymer.

When one of the conjugated dienes is 1,3-butadiene and it will be hydrogenated, the anionic polymerization of the conjugated diene hydrocarbons is typically controlled with structure modifiers such as diethylether or glyme (1,2-diethoxyethane) to obtain the desired amount of 1,4-addition. As described in Re 27,145 which is incorporated by reference herein, the level of 1,2-addition of a butadiene polymer or copolymer can greatly affect elastomeric properties after hydrogenation. The hydrogenated polymers exhibit improved heat stability and weatherability in the final adhesive, sealant or coating.

The epoxidized monohydroxylated polydiene polymers of the present invention are comprised of at least two polymerizable ethenically unsaturated hydrocarbon monomers wherein one is a diene monomer which yields unsaturation suitable for epoxidation. The most highly preferred polymers for use herein are diblock polymers which fall within the scope of formula (I) above. The overall molecular weight of such diblocks may range from 1500 to 20000, preferably 3000 to 7000. Either of the blocks in the diblock may contain some randomly polymerized vinyl aromatic hydrocarbon as described above. For example, where I represents isoprene, B represents butadiene, S represents styrene, and a slash (/) represents a random copolymer block, the diblocks may have the following structures:

I—B—OH  I—B/S—OH  I/S—B—OH  I—I/B—OH or
B/I—B/S—OH  B—B/S—OH  I-EB—OH  I-EB/S—OH
or
I—S/EB—OH  I/S-EB—OH  HO—I—S/B  HO—I—S/EB where EB is hydrogenated butadiene, -EB/S—OH means that the hydroxyl source is attached to a styrene mer, and —S/EB—OH signifies that the hydroxyl source is attached to a hydrogenated butadiene mer. This latter case, —S/EB—OH, requires capping of the S/EB "random copolymer" block with a mini EB block to compensate for the tapering tendency of the styrene prior to capping with ethylene oxide. These diblocks are advantageous in that they exhibit lower viscosity and are easier to manufacture than the corresponding triblock polymers. It is preferred that the hydroxyl be attached to the butadiene block because the epoxidation proceeds more favorably with isoprene and there will be a separation between the functionalities on the polymer. However, the hydroxyl may also be attached to the isoprene block if desired. This produces a more surfactant-like molecule with less load bearing capacity. The isoprene blocks may also be hydrogenated.

Certain triblock copolymers are also preferred for use herein. Such triblocks usually include a styrene block or randomly copolymerized styrene to increase the polymers glass transition temperature, compatibility with polar materials, strength, and room temperature viscosity. These triblocks include the following specific structures:

I-EB/S-EB—OH   I—B/S—B—OH   I—S-EB—OH
I—S—B—OH or
I—I/S—I—OH  I—S—I—OH  B—S—B—OH  B—B/S—B—OH or
I—B/S—I—OH  I-EB/S—I—OH or
I—B—S—OH  I-EB—S—OH  HO—I-EB—S

The latter group of polymers specified in the last line above wherein the styrene block is external are represented by the formula $$(HO)_x\text{-A-B—S—}(OH)_y.$$   (III)

where A, B, S, x, and y are as described above.

Epoxidation of the base polymer can be effected by reaction with organic peracids which can be preformed or formed in situ. Suitable preformed peracids include peracetic and perbenzoic acids. In situ formation may be accomplished by using hydrogen peroxide and a low molecular weight fatty acid such as formic acid. Alternatively, hydrogen peroxide in the presence of acetic acid or acetic anhydride and a cationic exchange resin will form a peracid. The cationic exchange resin can optionally be replaced by a strong acid such as sulfuric acid or p-toluenesulfonic acid. The epoxidation reaction can be conducted directly in the polymerization cement (polymer solution in which the polymer was polymerized) or, alternatively, the polymer can be redissolved in an inert solvent. These methods are described in more detail in U.S. Pat. Nos. 5,229,464 and 5,247,026 which are herein incorporated by reference. In particular, we have found that when using peracetic acid for the epoxidation, the rate of epoxidation of residual aliphatic double bonds in polyisoprene and polybutadiene is the following. 1,4-polyisoprene mers (tri-substituted aliphatic double bonds)>1,4-polybutadiene mers (1,2-di-substituted aliphatic double bonds)>3,4-polyisoprene mers (1,1-di-substituted aliphatic double bonds)>1,2-polybutadiene mers (mono-substituted aliphatic double bonds). Neither 1,2-polybutadiene mers nor polystyrene mers have been observed to epoxidize. Thus, in the present invention both isoprene and butadiene are diene monomers which yield unsaturation suitable for epoxidation. Butadiene is limited, however, in that only the 1,4-polybutadiene mers are suitable for epoxidation according to the methods employed in the present invention.

The molecular weights of linear polymers or unassembled linear segments of polymers such as mono-, di-, triblock, etc., arms of star polymers before coupling are conveniently measured by Gel Permeation Chromatography (GPC), where the GPC system has been appropriately calibrated. For anionically polymerized linear polymers, the polymer is essentially monodisperse (weight average molecular weight/ number average molecular weight ratio approaches unity), and it is both convenient and adequately descriptive to report the "peak" molecular weight of the narrow molecular weight distribution observed. Usually, the peak value is between the number and the weight average. The peak molecular weight is the molecular weight of the main species shown on the chromatograph. For polydisperse polymers the weight average molecular weight should be calculated from the chromatograph and used. For materials to be used in the columns of the GPC, styrene-divinyl benzene gels or silica gels are commonly used and are excellent materials. Tetrahydrofuran is an excellent solvent for polymers of the type described herein. A refractive index detector may be used.

If desired, these block copolymers can be partially hydrogenated. Hydrogenation may be effected selectively as disclosed in U.S. Pat. Reissue 27,145 which is herein incorporated by reference. The hydrogenation of these polymers and copolymers may be carried out by a variety of well established processes including hydrogenation in the presence of such catalysts as Raney Nickel, nobel metals such as platinum and the like, soluble transition metal catalysts and titanium catalysts as in U.S. Pat. No. 5,039,755 which is also incorporated by reference. The polymers may have different diene blocks and these diene blocks may be selectively hydrogenated as described in U.S. Pat. No. 5,229,464 which is also herein incorporated by reference. Partially unsaturated hydroxylated polymers are preferred for further functionalization such as to make the epoxidized polymers of this invention. They can also be chlorinated, brominated, or reacted with maleic anhydride, or used directly for vulcanization or reaction with amino resins. The partial unsaturation preferably is such that 0.1 to 7 meq of aliphatic double bonds per gram of polydiene remain for subsequent epoxidation.

In one preferred embodiment of the present invention the epoxidized monohydroxylated polydiene is a diblock of the structure I-EB—OH where I is a partially saturated polyisoprene block, EB is a predominantly saturated polybutadiene block and OH is a terminal primary hydroxyl group. The polyisoprene block is the predominate site of epoxidation. Thus, the polyisoprene block is made sufficiently large to achieve the desired level of epoxidation. The peak molecular weight of I typically ranges from 100 to 6,000 daltons. More preferably the peak molecular weight of I ranges from 500 to 4,000 daltons. Most preferably the peak molecular weight of I ranges from 1,000 to 3,000 daltons. The peak molecular weight of EB typically ranges from 1,000 to 15,000 daltons. More preferably the peak molecular weight of EB ranges from 2,000 to 10,000 daltons. Most preferably the peak molecular weight of EB ranges from 3,000 to 6,000 daltons. The epoxidized monohydroxylated polydiene is preferably epoxidized such that it contains from 0.1 to 7.0 meq of epoxy per gram of polymer. More preferably the epoxy level is from 0.5 to 4.0 meq of epoxy per gram of polymer. Most preferably the epoxy level is from 0.8 to 3.0 meq of epoxy per gram of polymer.

In the adhesive formulations of the present invention the epoxidized monohydroxylated polydiene polymer is incorporated at an amount from about 15% to about 35% by weight basis the total weight of the formulation.

Hydrogentated, hydroxylated polydiene polymers are well known in the art. U.S. Pat. No. 5,393,843 teaches terminally functional hydrogenated polydienes based on 1,3-butadiene and the methods for preparing such polymers and is hereby incorporated by reference. U.S. Pat. No. 5,376,745 teaches terminally functional hydrogenated polydienes based on isoprene and the methods for preparing such polymers and is hereby incorporated by reference. These terminally functional polymers are useful in the present invention and are made using protected functional initiators as taught in U.S. Pat. No. 5,393,843 and U.S. Pat. No. 5,376,745 as well as by methods using diinitiators such as taught in U.S. Pat. No. 6,217,798.

The hydroxylated polydiene polymers of the present invention are low viscosity polymers. The peak molecular weight of the hydroxylated polydiene polymers ranges from 500 to 20,000 daltons. In a more preferred embodiment the peak molecular weight ranges from 1,000 to 10,000 daltons and in the most preferred embodiment it ranges from 2,000 to 6,000 daltons.

The hydroxylated polydiene polymers of the present invention are most preferably composed of 1,3-butadiene (hereafter referred to as butadiene), isoprene and mixtures thereof. Both of these diene monomers can polymerize in a linear 1,4-addition fashion. Alternately, butadiene can polymerize by 1,2-addition and isoprene can polymerize by 3,4-addition and in either case the polymer is said to contain vinyl groups. The amount of 1,2-addition or 3,4-addition is commonly referred to as vinyl content. In the present invention, when the hydroxylated polydiene polymer is composed of predominantly polybutadiene the preferred vinyl content is from 30% to 70% and more preferably it is from 50% to 65%. When the hydroxylated polydiene polymer is composed of predominantly of polyisoprene the preferred vinyl content is less than 20% and more preferably less than 10%.

The hydroxylated polydiene polymers of the present invention contain are characterized by terminal hydroxyl functionality. The hydroxyl functionality is the average number of hydroxyl groups per molecule or expressed alternately the molar ratio of hydroxyl groups to polymer molecules. In the case of a terminally functionalized linear polymer, the maximum theoretical primary hydroxyl functionality is 2.0. In one preferred embodiment of the present invention the hydroxylated polydiene polymer is linear and the hydroxyl functionality is greater than 1.0. In a more preferred embodiment the hydroxyl functionality of the linear polymer ranges from more than 1.0 to about 2.0. In a further preferred embodiment the hydroxyl functionality of the linear polymer ranges from 1.75 to 1.98 and in a most preferred embodiment it ranges from 1.85 to 1.97.

The hydroxylated polydiene polymers of the present invention are hydrogenated using the methods discussed herein. In one preferred embodiment of the present invention at least 80% of the diene unsaturation of the hydroxylated polydiene polymers is hydrogenated. In a more preferred embodiment the hydrogenation level is at least 90% and in a most preferred embodiment it is at least 95%.

In the adhesive formulations of the present invention, the hydrogenated hydroxylated polydiene polymer is incorporated at an amount from 10% to 30% by weight basis the total weight of the formulation.

One element of the adhesive formulation of the present invention is a starblock copolymer. The starblock copolymer is essential to the performance of the adhesive in that it imparts green strength in the uncured adhesive and flexibility and enhanced strength in the cured solid adhesive. It is believed that the starblock copolymer must be compatible with the adhesive formulation in order for these property advantages to be realized. Further, the structure and molecular weight of the starblock polymer must be such that it effectively enhances the network properties without causing prohibitively high viscosities.

The starblock copolymers of the present invention are constructed by coupling together arms which comprise at least one block of a hydrogenated polydiene and at least one block of poly(monovinyl arene). In the preferred embodiment, the starblock copolymers are represented by the structure $(S-D)_nY$ where S is block of poly(monovinyl arene), D is a block of hydrogenated diene, Y is the residue of a multifunctional coupling agent, and x is an integer from 3 to about 30. In one preferred embodiment of the present invention S is a polystyrene block of peak molecular weight ranging from 500 to 10,000 daltons, and D is a hydrogenated polyisoprene block of peak molecular weight ranging from 25,000 to 100,000 daltons. In a more preferred embodiment S is a polystyrene block of peak molecular weight ranging from 1,000 to 6,000 daltons, and D is a selectively hydrogenated polyisoprene block of peak molecular weight ranging from 40,000 to 60,000 daltons There are a wide variety of coupling agents or initiators that can be employed. Any polyfunctional coupling agent which contains more than four reactive sites can be employed. Examples of the types of compounds which can be used are disclosed in U.S. Pat. No. 4,096,203, and include the polyepoxides, polyisocyanates, polyimines, polyaldehydes, polyketones, polyanhydrides, polyhalides, and the like. These compounds can contain two or more types of functional groups such as the combination of epoxy and aldehyde groups, isocyanate and halide groups, and the like. Many suitable types of these polyfunctional compounds have been described in the literature. Coupling monomers are coupling agents where several monomer units are necessary for every chain end to be coupled. Divinylbenzene (DVB) is the most commonly used coupling monomer and results in star polymers. In the present invention it is preferred that the starblock copolymer be highly coupled. Commonly, the coupling efficiency is referred to as the percentage of arms incorporated into the starblock copolymer through reaction by the coupling agent. Highly coupled means coupling efficiency greater than 85%. It is more preferred that the coupling efficiency be greater than 90% and most preferred that the coupling efficiency be greater than 95%.

The level of the starblock copolymer in the adhesive formulation should be from 1% to 10% by weight. Using more than 10% by weight of the block copolymer can lead to prohibitively high viscosities and incompatibility problems in the formulation. When less than 1% of the starblock copolymer is used the advantages in physical properties is not significant. In the present invention the most preferred amount of starblock copolymer is from 2% to 8%.

It is common practice to add an adhesion promoting or tackifying resin that is compatible with the polymer. The resins useful for this invention normally have ring and ball softening points as determined by ASTM method E28 between about 20° C. and 150° C.

Rosin ester resins may be employed as tackifying resins. An examples of rosin ester resins of use in the present invention is SYLVALITE® RE 100L supplied by Arizona Chemical.

Aromatic resins may also be employed as tackifying resins, provided that they are compatible with the particular polymer used in the formulation. Useful resins include coumarone-indene resins, polystyrene resins, vinyl toluene-alpha methylstyrene copolymers and polyindene resins. Hydroxyl functional aromatic resins are of particular interest since the hydroxyl group is expected to offer compatibility with the epoxy and hydroxy functional polymers of the present invention. Examples of such resins are Novares LA 300, LA 700, LS 500 and LX200 supplied by Rutgers Chemicals.

Particularly useful for the present invention are hydrogenated hydrocarbon resins. These hydrogenated resins include such resins as REGALREZ® 1018, 1085, 1094, 1126, and 1139, and REGALITE® R91, R1100, R9100, R7100, R6100, R5100, R101, R125, and T140 supplied by Eastman Chemical, ARKON® P70, P90, P115, P125 supplied by Arakawa, and similar other resins such as the ESCOREZ® 5300, 5400, and 5600 resin series supplied by Exxon. Examples of high aromaticity content resins are REGALITE V1100 (16.6 wt %) and REGALITE V3100 (5 wt %) hydrogenated hydrocarbon resins. The preferred hydrogenated hydrocarbon resins have ring and ball softening points from 60 to 120° C. The most preferred hydrogenated hydrocarbon resins have ring and ball softening points from 80 to 110° C.

In the adhesive formulations of the present invention the tackifier is incorporated at an amount between 30% and 70% by weight basis the total weight of the formulation. More preferred are tackifier amounts from 40% to 60%. Most preferred are tackifier amounts from 45% to 55%.

The adhesives of this invention may be cured by cationic means using acid catalysts but are preferably cured by means of ultraviolet or electron beam radiation. Radiation curing utilizing a wide variety of electromagnetic wavelength is feasible. Either ionizing radiation such as alpha, beta, gamma, X-rays and high energy electrons or non-ionizing radiation such as ultraviolet, visible, infrared, microwave and radio frequency may be used. A complete description of how this irradiation may be accomplished is found in commonly assigned U.S. Pat. No. 5,229,464 which is herein incorporated by reference.

When using non-ionizing radiation it is necessary to employ a photoinitiator to initiate the crosslinking reaction. Useful photoinitiators include aryl sulfonium salts such as diaryliodonium, alkoxy-substituted diaryliodonium, triarylsulfonium, dialkylphenacylsulfonium, dialkyl-4-hydroxylphenylsulfonium salts. Because these salts are solids, they are usually dissolved at relatively high concentration in polar organic solvents such as propylene carbonate for easy dispensing. The anions in these salts generally possess low nucleophilic character and include $SbF_6^-$, $BF_4^-$, $PF_6^-$, $AsF_6^-$, and $B(C_6F_5)_4^-$ (tetrakis(pentafluorophenyl)borate). Specific examples include (4-octyloxyphenyl)-phenyl-iodonium hexafluoroantimonate, UVI-6990 (from Union Carbide), FX-512 (3M Company), and SILCOLEASE UV200CATA photoinitiators (Rhone-Poulenc Chemie). Bis (dodecylphenyl)iodonium hexafluoroantimonate, UV 9310 (GE), UV 1240 (Deuteron), UVI-6976 (Union Carbide), and UVE1014 (von Roll ISOLA) are especially effective.

The onium salts can be used alone or in conjunction with a photosensitizer to respond to long wave length UV and visible light. Examples of photosensitizers include thioxanthone, anthracene, perylene, phenothiazione, 1,2-benzathracene coronene, pyrene and tetracene. The photoinitiator and photosensitizer are chosen to be compatible with the polymer being crosslinked and the light source available. Preferred photosensitizer are 2-chlorothioxanthen-9-one (CTX) and isopropyl-thioxanthone (ITX) because they are effective in sensitizing commercially available alkyl-aryliodonium photoinitiator salts and these photoinitiator salts have been found to be advantageously compatible with epoxidized diene polymers. A specific example of a photosensitized photoinitiator useful in the present invention is UV 1241 (Deuteron) which is a combination of bis(dodecylphenyl)iodonium hexafluoroantimonate and ITX.

In a preferred embodiment of the present invention the photoinitiator is held in a micro-emulsion of the one of the low molecular weight components of the adhesive formulation. Incorporation in an emulsion favors accurate metering and effective dispersion of the photoinitiator in the adhesive formulation. The low molecular weight component may be the epoxidized monohydroxylated polydiene polymer, the hydrogenated hydroxylated polydiene polymer, the tackifier if liquid at formulation temperatures, or in mixtures thereof. In the most preferred embodiment the micro-emulsion of photoinitiator is made using the epoxidized monohydroxylated polydiene polymer. The amount of active photoinitiator in the micro-emulsion is typically 2% to 4% by weight. An amount of micro-emulsion is added such that from 0.01% to 3% by weight of active photoinitiator is present in the adhesive formulation. Below 0.01% it is difficult to ensure homogeneous dispensing of the photoinitiator in the adhesive formulation and also the effectiveness of UV curing falls off. Above 3%, no additional effectiveness of UV curing is realized and the formulations can become too costly. The more preferred amount of photoinitiator is from 0.02% to 2% by weight. The most preferred range is from 0.025% to 1% of active photoinitiator.

Optional components of the present invention are stabilizers which inhibit or retard heat degradation, oxidation, skin formation and color formation. Stabilizers are typically added to the commercially available compounds in order to protect the polymers against heat degradation and oxidation during the preparation, use and high temperature storage of the composition.

EXAMPLES

Materials

The adhesive formulations of the present invention were made using combinations of the following materials. Polymer A (L-207 from KRATON Polymers)is an epoxidized monohydroxylated polydiene polymer of the structure I-EB—OH having a total peak molecular weight of about 7000 where I is a predominantly unsaturated polyisoprene block, EB is a predominantly hydrogenated polybutadiene block and OH represents a terminal, primary hydroxyl group. Polymer A is epoxidized to a level of about 1.7 meq epoxy/g polymer. Polymer B is a hydrogenated, monohydroxylated polydiene polymer of the structure EB—OH where EB is hydrogenated polybutadiene of molecular weight about 4000 and is referred to as an EB mono-ol. The hydroxyl functionality of Polymer B (L-1203 from KRATON Polymers) is about 0.98. Polymer C (L-2203-2 from KRATON Polymers) is a hydrogenated, hydroxylated polydiene polymer of the structure HO-EB-OH where EB is hydrogenated polybutadiene of molecular weight about 3000 and HO and OH are primary hydroxyl groups and is referred to as an EB-diol. The hydroxyl functionality of Polymer C is about 1.97 and as such is a diol. Polymer D (G-1780 from KRATON Polymers) is a starblock copolymer represented by the structure $(S-EP)_nY$ where S is a polystyrene block of molecular weight 3500, EP is a hydrogenated polyisoprene block of molecular weight about 50,000, Y is the residue of DVB, and n is in the range of 15-20, and there is less than 5% uncoupled S-EP diblock. Polymer E (G-1750 from KRATON Polymers) is a starblock polymer of coupled hydrogenated polyisoprene arms having a total peak molecular weight of about 500,.000. Tackifier 1 is REGALITE R-9100 (Eastman Chemicals). Antioxidant, AO, is Irganox 1010 (Ciba Geigy). Tackifier 2 is Arkon P90 (Arakwawa). The photoinitiator, PI, is UVE 1014 (Von Roll Isola) and is held in a micro-emulsion of Polymer A at 5% by weight photoinitiator. This photoinitiator is 50% by weight active as-received. The amounts of PI expressed in these examples are amounts of the micro-emulsion. So, for instance 2% by weight of the micro-emulsion corresponds to 0.05% by weight of active photoinitiator.

Test Methods

Peel properties were measured at room temperature using a 180° peel angle according to Pressure Sensitive Tape Council Method No. 1. High values indicate desirable high strength when peeling a test tape from a substrate. Both steel and polypropylene substrates were used in the 180° peel tests.

The holding power of an adhesive was measured according to Pressure Sensitive Tape Council Method No. 7. In this method, the time required to pull a test tape from a stainless steel surface is measured. A 1 inch by 1 inch section of the test tape was applied to the stainless steel substrate and a weight was applied to the tape. The tape/substrate assembly is mounted in an anti-peel configuration, 2° from vertical. Long times indicate desirable high adhesive strength. The higher the temperature at which the tape must hold the weight and the heavier the weight, the more difficult the holding power test. Holding power was measured using a 1 kg weight at 95° C., and/or a 2 kg weight at 70° C.

Creep Peel, or 90° Peel, measurements were performed to measure the low shear properties of the applied adhesive. In this test a 1 inch adhesive tape is applied to the bottom side of a polypropylene substrate and a 75 g weight is suspended so that a 90° peel geometry is created. The rate at which the tape debonds from the polypropylene surface was measured. This test was performed at 40° C. Low creep peel rates are desirable.

Example 1

Adhesive formulations of the invention were made according to the proportions listed in Table 1. Formulations 1-A, 1-B, 1-C and 1-E were comprised of an epoxidized monohydroxylated polydiene polymer (Polymer A), an EB-diol (Polymer C), a starblock copolymer (Polymer D), and Tackifier 1 at various relative levels of Polymer C. In every case, the formulation containing these three components yielded adhesives with excellent 95° C. holding power which is evidence of their excellent high temperature performance. Comparative 1-1 and 1-2 in Table 1 are formulations in which the EB-diol (Polymer C) was replaced by an EB-mono-ol (Polymer B). The 95° C. holding power of these Comparatives is at least one order of magnitude less than the formulations of the invention. Comparision of Comparative 1-1 and 1-2 to Formulations 1-A, 1-B, 1-C and 1-E clearly shows that the combination of epoxidized monohydroxylated polydiene polymer (Polymer A), EB-diol (Polymer C) and a hydrogenated star block copolymer (Polymer D) yielded excellent high temperature properties without over-crosslinking and deleteriously effecting peel properties.

high temperature holding power and desirably low 90° peel rates. Comparison of adhesive 2-B against Comparative 2-1 shows that poor 90° peel rates resulted when the starblock copolymer (Polymer D) was excluded from the formulation. Comparison of adhesive 2-B against Comparative 2-3 and adhesive 2-C against Comparative 2-4 shows that replacement of the EB-diol (Polymer C) by EB-mono-ol (Polymer

TABLE 1

| Component | 1-A | 1-B | 1-C | 1-E | Comparative 1-1 | Comparative 1-2 |
|---|---|---|---|---|---|---|
| Polymer A | 30.12 | 25.55 | 20.97 | 16.40 | 19.78 | 19.78 |
| Polymer B | 0.00 | 0.00 | 0.00 | 0.00 | 24.07 | 24.07 |
| Polymer C | 13.73 | 18.30 | 22.88 | 27.45 | 0.00 | 0.00 |
| Polymer D | 4.00 | 4.00 | 4.00 | 4.00 | 4.00 | 4.00 |
| Tackifier 1 | 50.00 | 50.00 | 50.00 | 50.00 | 50.00 | 0 |
| Tackifier 2 | 0 | 0 | 0 | 0 | 0 | 50.00 |
| PI | 2.00 | 2.00 | 2.00 | 2.00 | 2.00 | 2.00 |
| AO | 0.15 | 0.15 | 0.15 | 0.15 | 0.15 | 0.15 |
| Total | 100.00 | 100.00 | 100.00 | 100.00 | 100.00 | 100.00 |
| Ratio of Polymers A:B or A:C | 70:30 | 60:40 | 50:50 | 40:60 | 47:53 | 47:53 |
| 95° C. Holding Power, 1 kg, hr | >33 | 22 | 29 | >33 | 1.0 | .9 |
|  | 29 | >33 | >33 | 4 | .8 | .9 |
|  | >33 | >33 | >33 | >33 | .8 | 1.1 |
| Avg. 90° Peel Rate from PP at 40° C., mm/min | 0.32 | 1.09 | 0.62 | 0.99 | 1.70 | 12.75 |
| Avg. RT 180° Peel from SS, pli | 3.2 | 3.6 | 3.6 | 3.5 | 4.1 | 3.3 |
| Avg. RT 180° Peel from PP, pli | 1.4 | 2.0 | 3.0 | 4.0 | 4.2 | 4.4 |

Example 2

Adhesive formulations of the invention were made according to the proportions listed in Table 2. Formulations 2-B and 2-C were comprised of an epoxidized monohydroxylated polydiene polymer (Polymer A), an EB-diol (Polymer C), a starblock copolymer (Polymer D), and Tackifier 1 at a Polymer A to Polymer C ratio of 52/48 at two levels of Polymer D. The data of Table 2 demonstrates that the adhesive formulations of the invention have excellent B) resulted in poor holding power. Comparison of adhesive 2-B against Comparative 2-5 shows that when an EP star polymer (Polymer E), which does not comprise at least one styrene block, replaced the styrenic starblock copolymer (Polymer D) poor holding power resulted. Comparison of adhesive 2-B against Comparative 2-6 shows that when the EB-diol (Polymer C) and the styrenic starblock copolymer (Polymer D) were replaced by an EB-mono-ol (Polymer B) and a EP star polymer (Polymer E), respectively, even further deleterious reductions in holding power were realized.

TABLE 2

|  | Comparative 2-1 | 2-B | 2-C | Comparative 2-2 | Comparative 2-3 | Comparative 2-4 | Comparative 2-5 | Comparative 2-6 |
|---|---|---|---|---|---|---|---|---|
| Polymer A | 23.93 | 21.93 | 19.93 | 23.93 | 21.93 | 19.93 | 21.93 | 21.93 |
| Polymer B | 0 | 0 | 0 | 23.93 | 21.93 | 19.93 | 0 | 21.93 |
| Polymer C | 23.93 | 21.93 | 19.93 | 0 | 0 | 0 | 21.93 | 0 |
| Polymer D | 0 | 4.00 | 8.00 | 0 | 4.00 | 8.00 | 0 | 0 |
| Polymer E | 0 | 0 | 0 | 0 | 0 | 0 | 4.00 | 4.00 |
| Tackifier 1 | 50.00 | 50.00 | 50.00 | 50.00 | 50.00 | 50.00 | 50.00 | 50.00 |
| PI | 2.00 | 2.00 | 2.00 | 2.00 | 2.00 | 2.00 | 2.00 | 2.00 |
| AO | 0.15 | 0.15 | 0.15 | 0.15 | 0.15 | .15 | .15 | .15 |
| Total | 100.00 | 100.00 | 100.00 | 100.00 | 100.00 | 100.00 | 100.00 | 100.00 |
| 95° C. Holding Power, 1 kg, hr | 0 | >33 | >33 | >33 | 2.2 | 1.1 | 5.1 | 1.2 |
|  | >33 | >33 | >33 | >33 | 1.3 | 2.5 | 5.0 | 1.7 |
| 70° C. Holding Power, 2 kg, hr | >33 | >33 | 14 | >33 | 2.4 | 1.8 | 9.8 | 1.8 |
|  | >33 | >33 | 12 | >33 | 2.3 | 2.1 | 14 | 1.9 |
| Avg. 90° Peel Rate from PP at 40° C., mm/min | 8.49 | 0.48 | 0.28 | 8.35 | 1.37 | 0.36 | 58.2 | 26.7 |
| Avg. RT 180° Peel from SS, pli | 3.5 | 3.7 | 4.0 | 4.6 | 4.5 | 5.4 | 4.3 | 4.2 |

TABLE 2-continued

|  | Comparative 2-1 | 2-B | 2-C | Comparative 2-2 | Comparative 2-3 | Comparative 2-4 | Comparative 2-5 | Comparative 2-6 |
|---|---|---|---|---|---|---|---|---|
| Avg. RT 180° Peel from PP, pli | 1.7 | 2.9 | 4.2 | 4.7 | 3.7 | 4.7 | 3.7 | 4.1 |

Example 3

Adhesive formulations of the invention were made according to the proportions listed in Table 3. Formulations 3-B, 3-C and 3-D were comprised of an epoxidized monohydroxylated polydiene polymer (Polymer A), an EB-diol (Polymer C), a styrenic starblock copolymer (PolymerD), and Tackifier 1 at a Polymer A to Polymer C ratio of 70/30 but various levels of Polymer D. Comparison of inventive formulations 3-B, 3-C, or 3-D against Comparative 3-1 shows that incorporation of a styrenic starblock copolymer at levels from 2 to 6% weight resulted in an adhesive with both excellent high temperature holding power and good 90° peel rates. Absence of the styrenic starblock copolymer resulted in undesirably high 90° peel rates.

TABLE 3

|  | Comparative 3-1 | 3-B | 3-C | 3-D |
|---|---|---|---|---|
| Polymer A | 32.92 | 31.52 | 30.12 | 28.72 |
| Polymer C | 14.93 | 14.33 | 13.73 | 13.13 |
| Polymer D | 0 | 2.00 | 4.00 | 6.00 |
| Tackifier 1 | 50.00 | 50.00 | 50.00 | 50.00 |
| PI | 2.00 | 2.00 | 2.00 | 2.00 |
| AO | 0.15 | .15 | 0.15 | .15 |
| Total | 100.00 | 100.00 | 100.00 | 100.00 |
| 95° C. Holding Power, 1 kg, hr | >168 | >168 | >168 | >168 |
| Avg. 90° Peel Rate from PP at 40° C., mm/min | 3.88 | 1.06 | 0.98 | 0.23 |
| Avg. RT 180° Peel from SS, pli | 3.0 | 2.8 | 3.0 | 2.6 |
| Avg. RT 180° Peel from PP, pli | 0.9 | 0.5 | 1.4 | 1.1 |

Example 4

Adhesive formulations of the invention were made according to the proportions listed in Table 4. Formulations 4-A, 4-B, and 4-C were comprised of an epoxidized monohydroxylated polydiene polymer (Polymer A), an EB-diol (Polymer C), a styrenic starblock copolymer (PolymerD), and Tackifier 1 at a Polymer A to Polymer C ratio of 62/38 but various levels of tackifier. The results of Table 4 show that both excellent high temperature holding power and low 90° Peel have been achieved at tackifier levels from 45 to 55% by weight.

TABLE 4

|  | 4-A | 4-B | 4-C |
|---|---|---|---|
| Polymer A | 26.31 | 29.31 | 23.31 |
| Polymer C | 17.54 | 19.54 | 15.54 |
| Polymer D | 4.00 | 4.00 | 4.00 |
| Tackifier 1 | 50.00 | 45.00 | 55.00 |

TABLE 4-continued

|  | 4-A | 4-B | 4-C |
|---|---|---|---|
| PI | 2.00 | 2.00 | 2.00 |
| AO | 0.15 | 0.15 | 0.15 |
| Total | 100.00 | 100.00 | 100.00 |
| 70° C. Holding Power, 2 kg, hr | >33 >33 >33 | >33 >33 >33 | >33 >33 >33 |
| Avg. 90° Peel Rate from PP at 40° C., mm/min | 0.28 | 0.85 | 0.10 |

Example 5

An adhesive formulation of the invention was made according to the proportions listed in Table 5. The formulation 5-A was comprised of an epoxidized monohydroxylated polydiene polymer (Polymer A), an EB-diol (Polymer C), a styrenic block copolymer (Polymer D), and Tackifier 1 at a Polymer A to Polymer C ratio of 62/38. Comparison of inventive formulation 5-A against Comparative 5-1 shows that replacement of the EB-diol by an EB-mono-ol (Polymer B) resulted in poor 70° C. holding power.

TABLE 5

|  | 5-A | Comparative 5-1 |
|---|---|---|
| Polymer A | 26.31 | 26.31 |
| Polymer B | 0 | 17.54 |
| Polymer C | 17.54 | 0 |
| Polymer D | 4.00 | 4.00 |
| Tackifier 1 | 50.00 | 50.00 |
| PI | 2.00 | 2.00 |
| AO | 0.15 | 0.15 |
| Total | 100.00 | 100.00 |
| 95° C. Holding Power, 1 kg, hr | >168 | >168 |
| 70° C. Holding Power, 2 kg, hr | >33 >33 | 5.6 4.6 |
| Avg. 90° Peel Rate from PP at 40° C., mm/min | 0.14 | 0.88 |
| Avg. RT 180° Peel from SS, pli | 3.1 | 3.6 |
| Avg. RT 180° Peel from PP, pli | 1.4 | 2.1 |

While the examples illustrating the invention presented herein are directed toward adhesive formulations having aggressive room temperature tack they are, as such, particularly suitable as pressure sensitive adhesives. One of ordinary skill in the art would recognize that the invention could be applied to other adhesive systems. For instance, adhesive formulations of the present invention having good high temperature holding power and low 90° Peel rates, but low tack, could be useful as assembly, laminating, or packaging adhesives. In that case, the initial bonding would not be achieved by application of pressure at room temperature, hot melt or solvent application followed by an in-place UV cure. Systems having latent cure or slow cure characteristics are also useful for assembly, laminating, or packaging adhesives.

I claim:

1. A UV curable pressure sensitive adhesive consisting essentially of:
   a) from 15 percent to 35 percent by weight of an epoxidized monohydroxylazed polydiene polymer which is comprised of at least two polymerizable ethenically unsaturated hydrocarbon monomers wherein one is a diene monomer which yields unsaturation suitable for epoxidation and wherein the polymer has been epoxidized to have from 0.1 to 7.0 meq of epoxy functional group per gram of polymer;
   b) from 10 percent to 30 percent by weight of a hydrogenated, hydroxylated polydiene polymer which has on average from more than 1 to about 2 hydroxyl groups per molecule; and
   c) from 1 percent to 10 percent by weight of a selectively hydrogenated starblock copolymer wherein the arms of the star comprise at least one block of hydrogenated polydiene and at least one block of poly(monovinyl arene);
   d) from 30 percent to 70 percent by weight of a tackifier, and
   e) from 0.01 percent to 3 percent by weight of a photoinitiator.

2. The adhesive of claim 1 wherein the polymerizable ethenically unsaturated hydrocarbon monomers comprising the epoxidized monohydoxylated polydiene polymer are selected from the group consisting of isoprene, butadiene and styrene.

3. The adhesive of claim 1 wherein the diene monomer comprising the epoxidized monohydroxylated polydiene polymer which yields unsaturazion suitable for epoxidation is isoprene.

4. The adhesive of claim 1 wherein the epoxidized monohydroxylated polymer has from 0.5 to 4.0 meq of epoxy per gram of polymer.

5. The adhesive of claim 1 wherein the epoxidized polydiene polymer has the structure I —EB —OH wherein I is a partially saturated polyisoprene block of molecular weight from 100 to 6000 daltons, EB is a predominantly saturated hydrogenated polybutadiene block of molecular weight from 1000 to 15,000 daltons, OH is a terminal primary hydroxyl group, and has an epoxy level from about 0.5 to about 4.0 meq of epoxy per gram of polymer.

6. The adhesive of claim 5 wherein the partially saturated polyisoprene block has a molecular weight from 1,000 to 3,000 daltons, and the predominantly saturated polybutadiene block has a molecular weight from 3,000 to 6,000 daltons.

7. The adhesive of claim 5 wherein the epoxidized monohydroxylated polymer has an epoxy level from 0.8 to 3.0 meq of epoxy functional group per gram of polymer.

8. The adhesive of claim 1 wherein the hydrogenated hydroxylated polydiene polymer is composed of predominantly polybutadiene and has a peak molecular weight from 1,000 to 10,000 daltotis, a vinyl content between 30% and 70%, and a hydroxyl functionality from 1.75 to 1.98.

9. The adhesive of claim 8 wherein the hydrogenated hydroxylated polydiene polymer has a peak molecular weight from 2,000 to 6,000 daltons.

10. The adhesive of claim 1 wherein the hydrogenated hydroxylated polydiene polymer has at least 90% of the diene unsaturated hydrogenated.

11. The adhesive of claim 1 wherein the selectively hydrogenated starblock copolymer has the structure $(S{\sim}EP)_n Y$ wherein S is a polystyrene block of molecular weight from 1,000 to 10,000 daltons, EP is a hydrogenated polyisoprene block of molecular weight from 25,000 to 100,000 daltons, n is an integer from 3 to 30, and Y is the residue of a multifianctional coupling agent.

12. The adhesive of claim 11 wherein the selectively hydrogenated starblock copolymer has a polystyrene block of molecular weight from 1,000 to 6,000 daltons and a hydrogenated polyisoprene block of molecular weight from 40,000 to 60,000 daltons.

13. The adhesive of claim 1 wherein the photoinitiator is a triaryl sulfonium salt.

14. The adhesive of claim 1 wherein the photoinitiator is a diaryl iodonium salt.

15. The adhesive of claim 14 wherein the photoinitiator is present in an amount from 0.025% to 1% by weight.

16. The adhesive of claim 14 wherein the photoinitiator is bis(dodecylphenyl) iodonium hexafluoroantimonate.

17. The adhesive of claim 1 wherein the tackifier is a hydrogenated hydrocarbon resin.

18. The adhesive of claim 17 wherein the hydrogenated hydrocarbon resin is present in an amount from 40 to 60 percent by weight.

19. The adhesive of claim 17 wherein the hydrogenated hydrocarbon resin is present in an amount from 45 to 55 percent by weight.

20. The adhesive of claim 17 wherein the hydrogenated hydrocarbon resin has a ring and ball softening point from 80 to 110° C.

* * * * *

UNITED STATES PATENT AND TRADEMARK OFFICE
CERTIFICATE OF CORRECTION

PATENT NO. : 7,163,968 B2  
APPLICATION NO. : 10/803071  
DATED : January 16, 2007  
INVENTOR(S) : James R. Erickson It is certified that error appears in the above-identified patent and that said Letters Patent is hereby corrected as shown below:

Col. 16, line 17,

Claim 11 should read:

The adhesive of claim 1 wherein the selectively hydrogenated starblock copolymer has the structure (S-EP)nY wherein S is a polystyrene block of molecular weight from 1,000 to 10,000 daltons, EP is a hydrogenated polyisoprene block of molecular weight from 25,000 to 100,000 daltons, n is an integer from 3 to 30, and Y is the residue of a multi-functional coupling agent.

Signed and Sealed this

Third Day of April, 2007

JON W. DUDAS  
*Director of the United States Patent and Trademark Office*